United States Patent
Zhang et al.

(10) Patent No.: US 8,196,907 B2
(45) Date of Patent: Jun. 12, 2012

(54) SYSTEM FOR CONDITIONING THE AIRFLOW ENTERING A TURBOMACHINE

(75) Inventors: Jianmin Zhang, Greer, SC (US);
Douglas S. Byrd, Greer, SC (US);
James P. Tomey, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 471 days.

(21) Appl. No.: 12/542,764

(22) Filed: Aug. 18, 2009

(65) Prior Publication Data

US 2011/0042836 A1    Feb. 24, 2011

(51) Int. Cl.
*B01F 3/04* (2006.01)
(52) U.S. Cl. .............. 261/116; 96/355; 96/356
(58) Field of Classification Search ......... 96/355, 96/356; 261/30, 116, 117; 236/44 C
See application file for complete search history.

(56) References Cited

U.S. PATENT DOCUMENTS 6,129,285 A * 10/2000 Schafka ............... 236/44 C
* cited by examiner

*Primary Examiner* — Robert A Hopkins
(74) *Attorney, Agent, or Firm* — Cantor Colburn LLP

(57) ABSTRACT

An embodiment of the present invention provides an air conditioning system (ACS) for conditioning the airstream entering an air-consuming machine, such as, but not limiting of, a gas turbine. Conditioning may be considered a process that adjusts at least one physical property of the airstream. The physical property may comprise: a wet-bulb temperature, a dry-bulb temperature, relative humidity, density, or the like. In an embodiment of the present invention, the major components of the ACS may be located in a single structure, which may be considered a module. Depending on the application of the ACS, multiple modules may be physically and/or operationally integrated on the air-consuming machine. An alternate embodiment of the ACS may comprise a module having multiples stages. Here, each stage may operate independently other stages. Furthermore, each stage may use a separate fluid from other stages.

20 Claims, 4 Drawing Sheets

SYSTEM FOR CONDITIONING THE AIRFLOW ENTERING A TURBOMACHINE

This application is related to commonly-assigned U.S. patent application, Ser. No. 12/477,535, filed on Jun. 3, 2009.

BACKGROUND OF THE INVENTION

The present invention relates generally to an airstream entering an air-consuming machine; and more particularly to a system for conditioning the airstream entering the inlet system of the air-consuming machine.

Air-consuming machines generate, and/or transform, the energy used in a wide variety of applications. These machines may have the form of: a heat exchanger; an air-consuming turbomachine, such as, but not limiting of, a gas turbine, an aircraft engine, an aero-derivative engine; or the like. Although, the following discussion primarily focuses on gas turbines, the concepts discussed are not limited to gas turbines.

A gas turbine typically includes: an inlet system, a compressor section, a combustion section, a turbine section, and an exhaust section. A gas turbine may operate as follows. The inlet system receives the airstream from the ambient environment of the gas turbine. The compressor section compresses the airstream. The compressed airstream flows to the combustion section where fuel mixing may occur, prior to combustion. The combustion process generates a gaseous mixture that drives the turbine section. The turbine section converts the energy of the gaseous mixture to the mechanical energy in the form of torque. The torque is customarily used to drive an electrical generator, a mechanical drive, or the like.

Gas turbine performance is commonly determined by the output, thermal efficiency, and/or heat rate. The temperature and humidity of the incoming airstream can have significant impacts on the gas turbine performance. Generally, the gas turbine become less efficient as the temperature of the airstream increases.

Various systems have been utilized to reduce the inlet airstream temperature. The primary goal of these systems is to increase gas turbine performance during ambient conditions that have higher airstream temperatures and/or humidity. These systems attempt to achieve this goal by conditioning the airstream prior to entering the compressor section. Conditioning may be considered the process of adjusting at least one physical property of the airstream. The physical property may include, but is not limited to: a wet-bulb temperature, a dry-bulb temperature, humidity, and density. The effect of adjusting the physical property of the airstream should be to improve the performance of the gas turbine.

Some known examples of these systems include: evaporative coolers, mechanical chillers, absorption chillers, thermal energy systems, and the like. These systems may be installed at various locations around the gas turbine.

There are a few concerns with known systems for conditioning the airstream entering a gas turbine. The benefits associated with the known systems do not justify the economic costs associated with the installation. The use of an evaporative cooling system may be limited in areas where hot and humid conditions are prominent. Known chilling systems require a coil, which significantly adds to the cost of the chilling system. Some known gas turbine powerplants incorporate both evaporative cooling system and chilling systems. Here, the separate structures of these systems require additional installation time, space near the gas turbine, and also increase operation and maintenance cost.

For the foregoing reasons, there may be a desire for a new and improved system for conditioning the inlet airstream. The system should allow for greater operability in hot and humid areas, while also operating efficiently in hot and dry areas. The system should provide a single structure that can provide evaporative cooling and chilling capabilities. The system should also provide a chilling system that does not require a coil.

BRIEF DESCRIPTION OF THE INVENTION

In an embodiment of the present invention, a system for conditioning an airstream entering an air-consuming machine, the system comprising: an air conditioning system (ACS) configured for adjusting a physical property of an airstream entering an air-consuming machine, wherein the air conditioning system comprises a module, and wherein the module comprises: a non-media conditioning system configured for adjusting a physical property of the airstream if an ambient condition is within a range; wherein the non-media conditioning system comprises nozzles adapted for spraying a fluid onto the airstream; and a direct exchange medium configured for adjusting a physical property of the airstream to provide additional output of the air-consuming machine; wherein if the fluid supplied to the ACS is approximately greater than a dew point temperature, then the ACS operates in the direct evaporative mode; and wherein if the fluid supplied to the ACS is approximately less than the dew point temperature, then the ACS operates in the direct chilling mode.

In an alternate embodiment of the present invention, a system for increasing an output of an energy producing facility comprising an air-consuming machine, the system comprising: a gas turbine comprising an inlet system, wherein the inlet system comprises at least one of: a weather hood, an inlet filter house, a transition piece, an inlet duct, and an inlet bleed heat section; and an air conditioning system (ACS) configured for adjusting a physical property of an airstream entering the gas turbine, wherein the air conditioning system comprises a plurality of modules, and wherein each module comprises: a non-media conditioning system configured for adjusting a physical property of the airstream if an ambient condition is within a range; wherein the non-media conditioning system comprises nozzles configured for spraying a fluid onto the airstream; and a direct exchange medium configured for adjusting a physical property of the airstream.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology may be used herein for convenience only and is not to be taken as a limitation on the invention. For example, words such as "above", "below", "top", "bottom", "upper", "lower", "left", "front", "right", "horizontal", "vertical", "upstream", "downstream", "fore", and "aft" merely describe the configuration shown in the FIGS. Indeed, the component(s) may be oriented in any direction and the terminology, therefore, should be understood as encompassing such variations unless specified otherwise.

As used herein, an element or step recited in the singular and preceded with "a" or "an" should be understood as not excluding plural elements or steps, unless such exclusion is explicitly recited. Furthermore, references to "an embodiment" of the present invention are not intended to exclude additional embodiments incorporating the recited features.

An embodiment of the present invention provides an air conditioning system (ACS) for conditioning the airstream entering an air-consuming machine, such as, but not limiting of, a gas turbine. As discussed, conditioning may be considered a process that adjusts at least one physical property of the airstream. The physical property may comprise: a wet-bulb temperature, a dry-bulb temperature, relative humidity, density, or the like. In an embodiment of the present invention, the major components of the ACS may be located in a single structure, which may be considered a module. Depending on the application of the ACS, multiple modules may be physically and/or operationally integrated on the air-consuming machine. The discussion below focuses on a non-limiting embodiment of the ACS integrated with a gas turbine.

Figure 2:
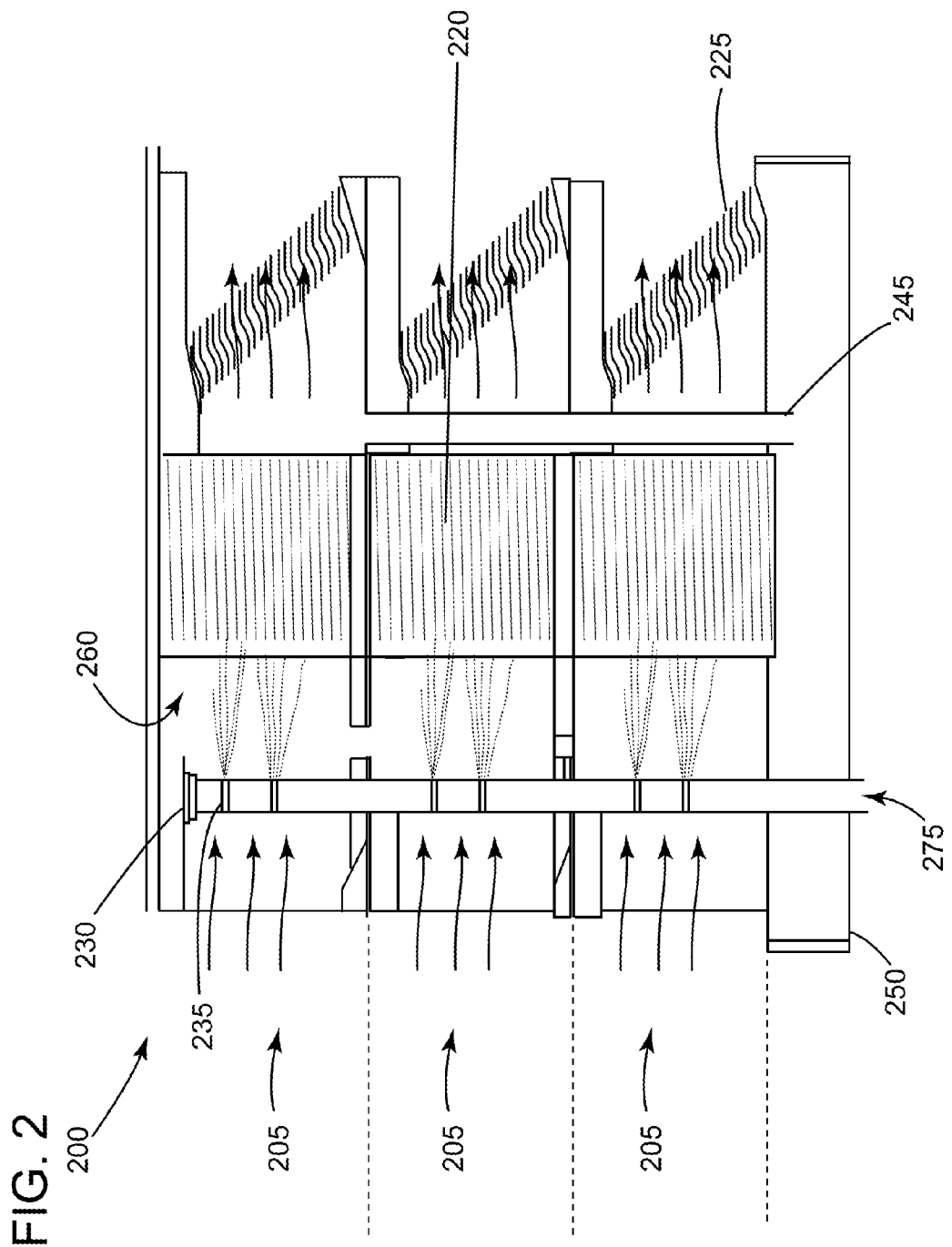
FIG. 2 is a schematic illustrating an elevation view of modules of an air conditioning system, in accordance with an embodiment of the present invention.
Figure 3:
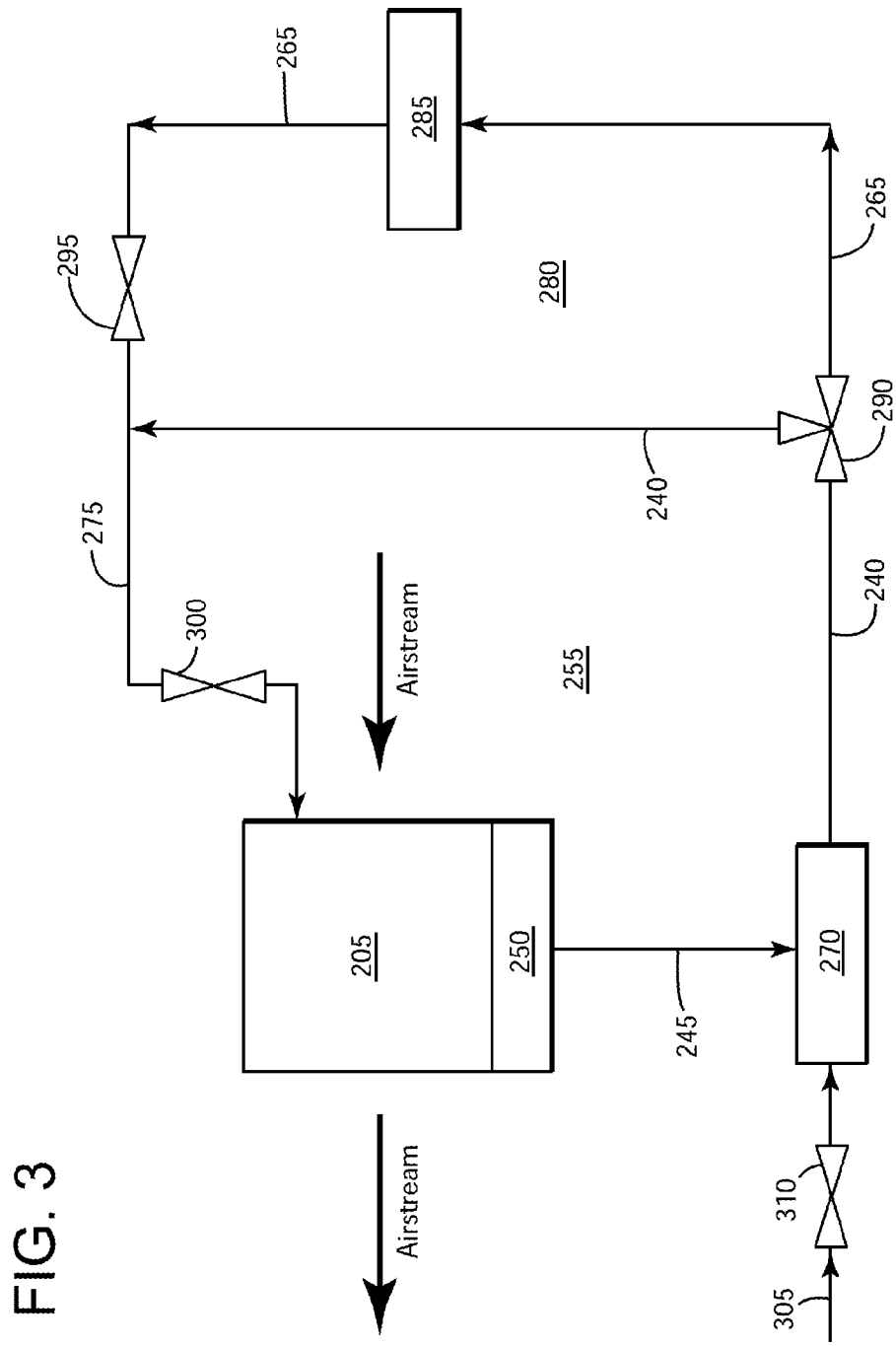
FIG. 3 is a schematic illustrating a schematic of an air conditioning system, in accordance with an embodiment of the present invention.

An embodiment of the present invention may provide an ACS comprising a non-media conditioning system and a media conditioning system, each of which are illustrated in FIGS. 2 and 3. An embodiment of the ACS may provide the flexibility of operating in either an evaporative system mode or a chilling system mode. Here, if the fluids supplied to the non-media conditioning system and to the media conditioning system are greater than the dew point temperature, then the ACS may function as an evaporative system. Similarly, if the fluids supplied to the non-media conditioning system and to the media conditioning system are less than the dew point temperature, then the ACS may function as a chilling system.

Figure 1:
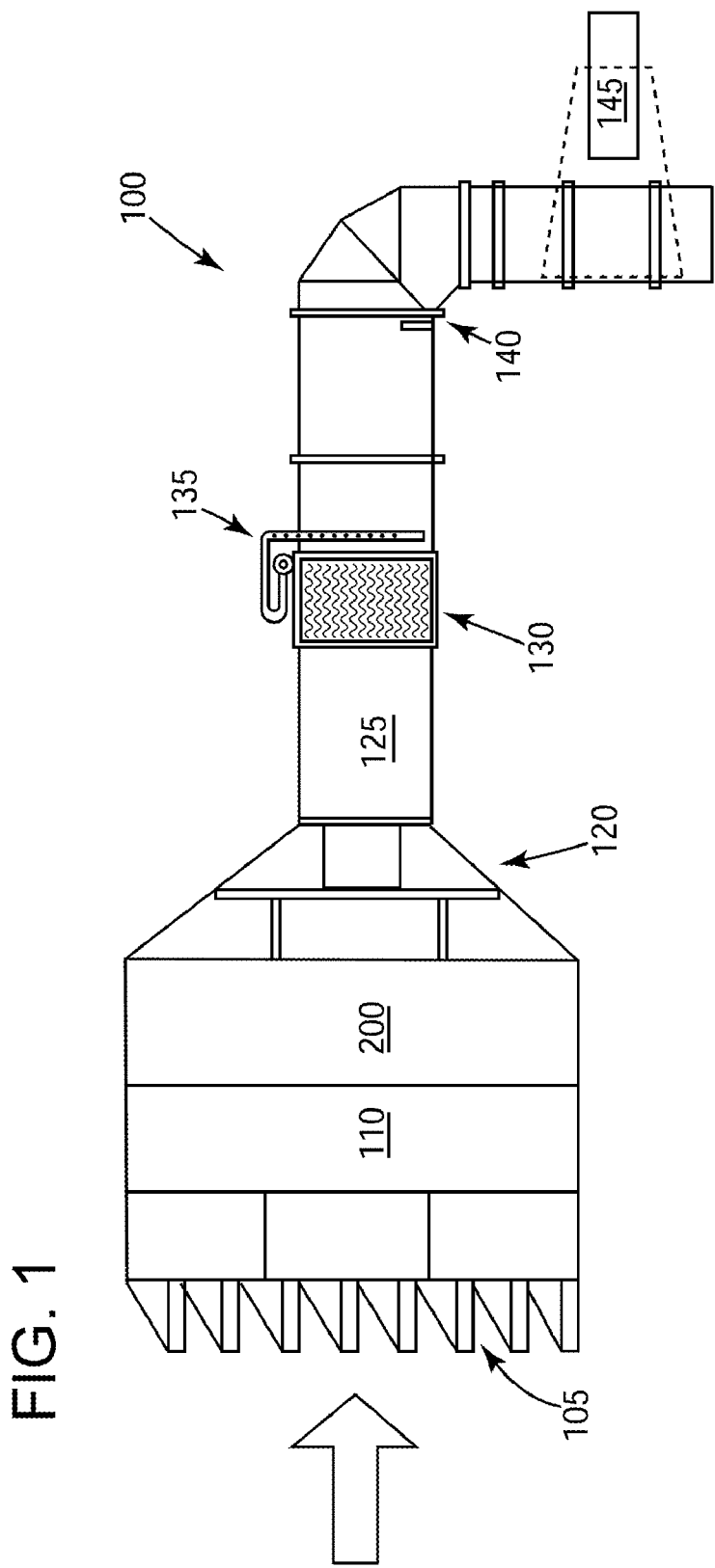
FIG. 1 is a schematic illustrating an environment where an embodiment of the present invention may operate.

Referring now to the FIGS., where the various numbers represent like elements throughout the several views. FIG. 1 is a schematic illustrating an environment where an embodiment of the present invention may operate. FIG. 1 illustrates an inlet system 100 that is typically integrated with a compressor 145 of a gas turbine. The following description provides an overview of a typical configuration of an inlet system 100. The present invention may be used with other configurations of the inlet system 100, which are not illustrated in the FIGS.

The inlet system 100 channels the airstream, represented as an arrow(s) throughout the FIGS., drawn in by the compressor 145. The airstream usually comes from the environment in which the gas turbine operates. Initially, the airstream flows around a weather hood 105, which may prevent weather elements, such as rain, snow, hail, or the like, from entering the compressor 145. The airstream may then flow through an inlet filter house 110; which generally removes foreign objects and debris from the airstream. Next, the airstream may flow through the ACS 200, which may condition a physical property of the airstream. Next, the airstream may flow through a transition piece 120 and an inlet duct 125; these components may adjust the velocity and pressure of the airstream. Next, the airstream may flow through a silencer section 130. Next, the airstream may flow through an inlet bleed heat system 135, which, when used, increases the airstream temperature prior to entering the compressor 145. A trash screen 140, or the like, may be located downstream of the inlet duct 125 and generally may prevent debris from entering the compressor 145.

FIG. 2 is a schematic illustrating an elevation view of modules 205 of an air conditioning system 200, in accordance with an embodiment of the present invention. FIG. 2 illustrates that an embodiment of the present invention has major components of the air conditioning system 200 with a module 205. FIG. 2 also illustrates how an embodiment of the present invention allows for the integration of multiple modules 205, all of which may be housed within an inlet system 100. Three (3) similar modules 205 are illustrated in FIG. 2 in a stacked configuration. For the convenience of the reader, the use of redundant component/element numbers has been limited. For example, but not limiting of, component/element number 225, which represents a mist eliminator, is only shown on the bottom module 205. The upper two modules 205 also have a mist eliminator 225, as illustrated in FIG. 2.

In an embodiment of the present invention, the major components of the ACS 200 may be located within the module 205. These may include components of the non-media conditioning system 230, the media conditioning system 260, and a mist eliminator 225.

Operationally, the modules 205 may receive a fluid, such as, but not limiting of, water, a coolant, or combinations thereof, from a header 275. The header 275 may receive the fluid from the non-chilled fluid supply 240, or the chilled fluid supply 265, depending on the operational mode of the ACS 200. The header 275 may then discharge the fluid directly to the third valve 300 and/or to the module 205. As illustrated in FIGS. 2 and 3.

An embodiment of the non-media conditioning system 230 may provide spray nozzles 235 (schematically illustrated in FIG. 2). The spray nozzles 235 may serve to precondition the airstream prior to engaging the media conditioning system 260. The preconditioning attempts to establish a nearly uniform temperature profile of the airstream exiting the direct exchange medium 220. The spray nozzles 235 may create fluid droplets of a size that may substantially evaporate prior to the airstream entering an inlet to the compressor 145. In an embodiment of the present invention, the spray nozzles 235 may have a nozzle size of from about 0.1 inches to about 0.25 inches. Here, a fluid system pressure may comprise less than about 150 pounds per square inch.

The components of the media conditioning system 260 may include: a direct exchange medium 220 and a chilled fluid supply 265. The direct exchange medium 220 generally functions as a heat exchanger that utilizes the fluid to adjust a physical property, such as, but not limiting of, the dry-bulb temperature, of the airstream. Essentially, an embodiment of the direct exchange medium 220 allows for the fluid to directly contact the flowing airstream. The cooler temperature of the fluid may lower the dry-bulb temperature, and/or adjust another physical property of the airstream.

An embodiment of the direct exchange medium 220 may comprise the form of a media-type of heat exchanger. This form of direct exchange medium 220 generally provides a direct contact heat transfer process, which may minimize the heat transfer resistance compared to a coil-type of heat exchanger. Furthermore, this embodiment of the direct exchange medium 220 may be created from a corrugated cross-fluted material, such as, but not limiting of, a nylon, a plastic, a carbon fiber, a cellulose material, a synthetic polymer, a metal, or combinations thereof. This benefit may avoid the need for relatively expensive copper tubing and aluminum fins, which are commonly used to form a coil-type of heat exchanger. This embodiment of the direct exchange medium 220 may reduce the amount and type of material used for forming the heat transfer surface areas, which may result in a significant cost and weight reduction.

The module 205 may also comprise a mist eliminator 225. The mist eliminator 225 generally serves to remove some of the fluid that may be entrained in the airstream due to operation of the non-media conditioning system 230 and/or the media conditioning system 260. As illustrated in FIG. 2, an embodiment of the module 205 places the mist eliminator 225 downstream of the non-media conditioning system 230 and the media conditioning system 260.

FIG. 2 also illustrates how multiple modules 205 of an ACS 200 may be integrated within a single inlet system 100. FIG. 2 illustrates how three (3) independent non-media conditioning systems 230 may have a common supply of non-chilled fluid from the header 275 and a common collection tank 250. FIG. 2 also illustrates how three (3) independent media conditioning systems 260 may also have a common supply of chilled fluid from the header 275, fluid return 245, and all share a collection tank 250 with the non-media conditioning systems 230.

FIG. 3 is a schematic illustrating a schematic of an air conditioning system 200, in accordance with an embodiment of the present invention. FIG. 3 illustrates the components of the ACS 200, including those components that may not be located within the module 205. As described below, these components may be part of the first conditioning circuit 255, and/or the second conditioning circuit 280. The first conditioning circuit 255 may represent the ACS 200 operating in a direct evaporative cooling mode. Here, the first conditioning circuit may comprise: the non-chilled fluid supply 240; the non-media conditioning system 230; the media conditioning system 260; the collection tank 250; the fluid return 245, which may be connected to a pump 270; a first valve 290, which may comprise a three-way valve; and a third valve 300. The first conditioning circuit 255 may also comprise a make-up fluid supply 305 and a make-up supply valve 310, which may collectively operate to replenish the first conditioning circuit 255 of the fluid consumed during the evaporative process.

The second conditioning circuit 280 may represent the ACS 200 operating in a direct chilling mode. The second conditioning circuit 280 may comprise: the chilled fluid supply 265; the non-media conditioning system 230, the media conditioning system 260; the collection tank 250; the fluid return 245; the pump 270; the first valve 290; the source 285; the second valve 295; and the third valve 300.

In use, the ACS 200 may comprise at least two operating modes: an evaporative cooling mode that may primarily use the first conditioning circuit 255, and the chilling mode that may primarily use the second conditioning circuit 280. As discussed, an embodiment of the ACS 200 may provide the flexibility of operating in either an evaporative system mode or a chilling system mode. Here, if the fluids supplied to the non-media conditioning system 230 is greater than the dew point temperature, then the ACS 200 may function as an evaporative cooling system. Similarly, if the fluids supplied to the non-media conditioning system 230 is less than the dew point temperature, then the ACS 200 may function as a chilling system.

The following discussion provides an operational overview of an embodiment of the ACS 200. Operation of the ACS 200 in the evaporative cooling mode may comprise the following, non-limiting, steps. The non-media conditioning system 230, and the media conditioning system 260, portions of which may be within the module 205, may nearly simultaneously receive the fluid via the header 275, which may be supplied from the non-chilled fluid supply 240. Next, as the airstream flows through the module 205, the spray nozzles 235 may spray the airstream with the fluid. Next, as the airstream flows downstream, media conditioning system 260 may distribute fluid directly on the airstream now flowing through the direct exchange medium 220. Next, portions of the fluid may drain to the collection tank 250.

Then, the fluid return 245 may deliver some of the fluid within the collection tank 250 to an inlet of a pump 270. Furthermore, the make-up fluid supply 305 and the make-up supply valve 310 may operate to supply make-up fluid to the inlet of the pump 270. Next, an outlet of the pump 270 may move the fluid toward the first valve 290. In the three-way valve form, the first valve 290 may allow for the fluid from the pump 270 to flow within the first conditioning circuit 255.

After the airstream flows by the non-media conditioning system 230 and the direct exchange medium 220, the airstream may then flow downstream to the mist eliminator 225. Concurrently, the make-up fluid supply 305 may provide make-up fluid via the make-up supply valve 310 to the first conditioning circuit 255. As discussed, the make-up fluid generally serves to replenish the fluid consumed during the evaporation process.

In an embodiment of the present invention the third valve 300 may be used to isolate the ACS 200. Here, the third valve 300 may be closed when the ACS 200 may not be in operation.

Operation of the chilling mode may comprise the following, non-limiting steps. The non-media conditioning system 230, and the media conditioning system 260, portions of which may be within the module 205, may nearly simultaneously receive the fluid via the header 275, which may be supplied from the chilled fluid supply 265. Next, as the airstream flows through the module 205, the spray nozzles 235 may spray the airstream with the fluid. Next, the media conditioning system 260 may allow the fluid to engage the airstream flowing through the direct exchange medium 220. Next, portions of the fluid may drain into the collection tank 250. Next, the fluid return 245 may deliver some of the fluid within the collection tank 250 to an inlet of a pump 270. Next, an outlet of the pump 270 may move the fluid toward the first valve 290. Here, the first valve 290 may allow for the fluid from the pump 270 to flow within the second conditioning circuit 280. A source 285 may also provide fluid to the second conditioning circuit 285, if additional fluid is required. The source 285 may comprise any supply capable of delivering the required flowrate and pressure of the fluid. For example, but not limiting of, the source 285 may comprise at least one of: a thermal storage system, a storage tank, a cooling fluid system, or the like. After the airstream flows by the direct exchange medium 220, the airstream may then flow downstream to the mist eliminator 225.

In an embodiment of the present invention, a flowrate of the fluid flowing through the nozzles maybe increased to perform a cleaning function on components of the ACS 200. This feature may help to maintain an operational efficiency and effectiveness of the ACS 200. For example, but not liming of the cleaning function may clean the direct exchange medium 220.

Figure 4:
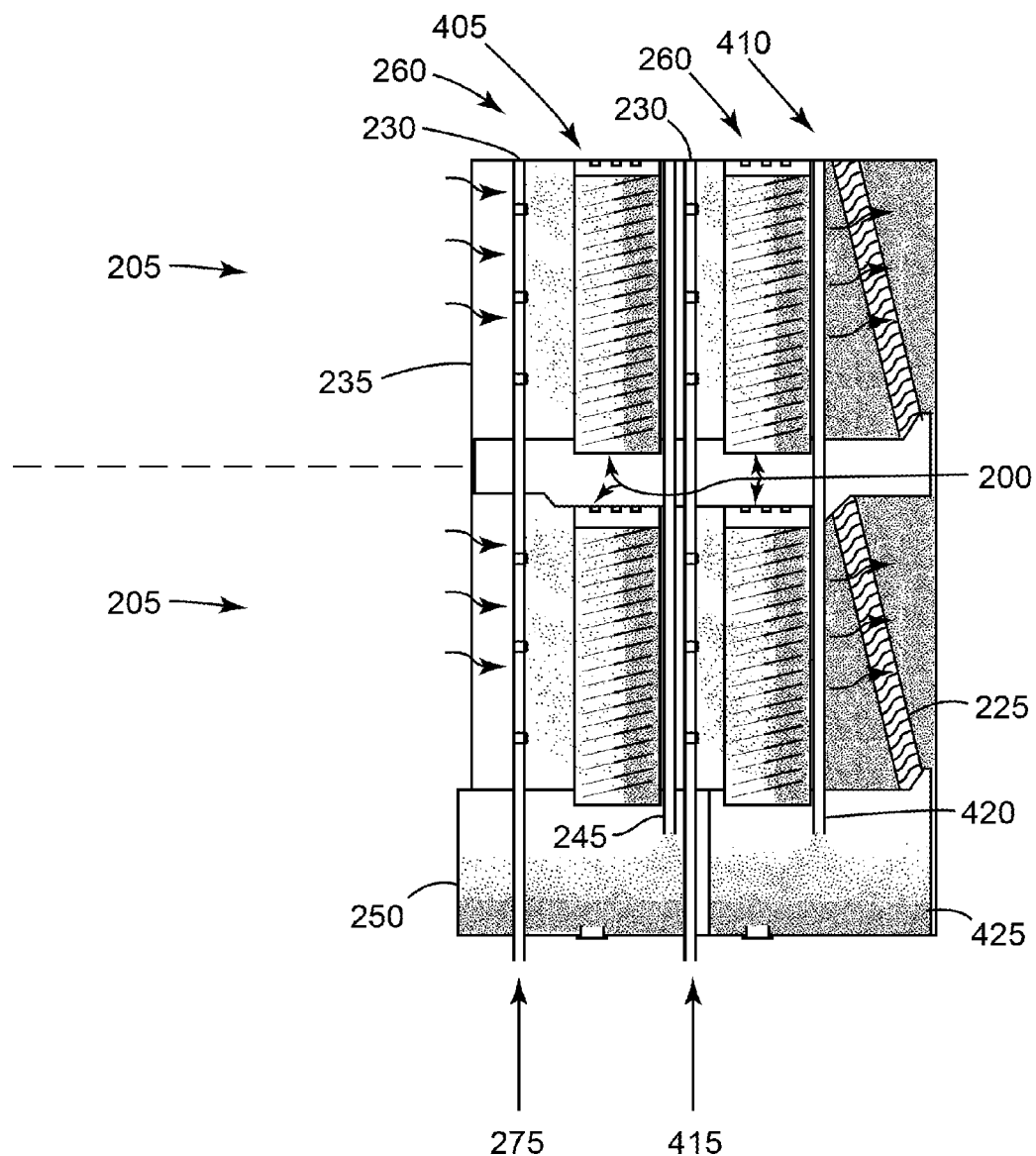
FIG. 4 is a schematic illustrating an elevation view of an alternate embodiment of the modules of FIG. 2, in accordance with an embodiment of the present invention.

FIG. 4 is a schematic illustrating an elevation view of an alternate embodiment of the modules 205 of FIG. 2, in accordance with an embodiment of the present invention. Essentially, this alternate embodiment comprises multiple conditioning zones within the module 205. Each zone may be configured to condition the airstream independently of any other zone of the module 205. This may allow for staged conditioning of the airstream.

FIG. 4 illustrates a non-limiting example of the alternate embodiment of the module 205. This example provides a model 205 comprising two zones. Other configuration of this alternate embodiment may comprise more than two zones and provide more than two stages of conditioning of the airstream.

As illustrated in FIG. 4, the module 205 comprises a first stage 405 and a second stage 410. The first and second stages 405, 410 may each comprise similar components of the non-media conditioning system 230 and the media conditioning system 260, as described. The second stage 410 may also comprise a header 415, a fluid return 420, and a collection tank 425. These components may operate similar to the header 275, the fluid return 245, and the collection tank 250 of the first stage 405.

This alternate embodiment of the present invention may allow different fluids to condition the airstream. For example, but not limiting of, a first fluid may be used within the first stage 405 and a second fluid may be used within the second stage 410. Here, the first fluid may include at least one of: water, a liquid desiccant, or combinations thereof. Similarly, the second fluid may include at least one of: water, a liquid desiccant, or combinations thereof.

This alternate embodiment may allow a user to operate the ACS 200 with the first fluid at a first temperature and the second fluid at a second temperature. This alternate embodiment may also allow for the first fluid and second fluid to be different. For example, but not limiting of, the first fluid may be water and the second fluid may be liquid desiccant. This combination may provide for a desired temperature control of the airstream. This combination may also reduce the moisture content and relative humidity of the airstream.

As described, embodiments of the present invention provide a user a plurality of benefits and advantages over known systems. An embodiment of the present invention may provide broader applications and usage for direct exchange medium 220 usages in air conditioning systems 200. Depending on the temperature levels, the conditioning of the airstream may occur via: a) a pure evaporation process, where the fluid temperature is greater than or equal to the airstream wet-bulb temperature; or b) in the chilling process where the fluid temperature is substantially lower than the airstream wet-bulb temperature. Embodiments of the present invention may provide the flexibility of controlling the extent of the conditioning by regulating the temperature of the fluid An embodiment of the present invention may add more flexibility to the gas turbine operational economics by providing the choices of direct evaporative cooling and direct chilling during power generation. An embodiment of the present invention may offer improved cost-effectiveness relative to the known chiller coil units, reduced packaging costs, the lower pressure drops, and other structural benefits.

Although the present invention has been shown and described in considerable detail with respect to only a few exemplary embodiments thereof, it should be understood by those skilled in the art that we do not intend to limit the invention to the embodiments since various modifications, omissions and additions may be made to the disclosed embodiments without materially departing from the novel teachings and advantages of the invention, particularly in light of the foregoing teachings. Accordingly, we intend to cover all such modifications, omission, additions and equivalents as may be included within the spirit and scope of the invention as defined by the following claims.

What is claimed is:

1. A system for conditioning an airstream entering an air-consuming machine, the system comprising:
an air conditioning system (ACS) configured for adjusting a physical property of an airstream entering an air-consuming machine, wherein the air conditioning system comprises a module, and wherein the module comprises:
a non-media conditioning system configured for adjusting a physical property of the airstream if an ambient condition is within a range; wherein the non-media conditioning system comprises nozzles adapted for spraying a fluid onto the airstream; and
a direct exchange medium configured to produce a direct contact heat transfer for adjusting a physical property of the airstream to provide additional output of the air-consuming machine;
wherein if the fluid supplied to the ACS is approximately greater than a dew point temperature, then the ACS operates in the direct evaporative mode; and wherein if the fluid supplied to the ACS is approximately less than the dew point temperature, then the ACS operates in the direct chilling mode.

2. The system of claim 1, wherein the module of the air conditioning system is located within an inlet system of the air-consuming machine, wherein the inlet system comprises at least one of:
a weather hood;
an inlet filter house;
a transition piece;
an inlet duct; and
an inlet bleed heat section.

3. The system of claim 2, wherein a configuration of components within the module comprises: the non-media conditioning system located downstream of the inlet filter house, the direct exchange medium located downstream of the non-media conditioning system, and a mist eliminator located downstream of the direct exchange medium.

4. The system of claim 1, wherein a first conditioning circuit comprises: a non-chilled supply configured for dispersing the fluid to the nozzles, the direct exchange medium; and a tank for collecting portions of the fluid dispersed.

5. The system of claim 1, wherein a second conditioning circuit comprises: a chilled fluid supply configured for delivering the fluid from the source to the nozzles, and a fluid return for delivering a portion of the fluid dispersed by the nozzles.

6. The system of claim 1, wherein the module comprises multiple zones.

7. The system of claim 6 further comprising a first zone configured for conditioning the airstream.

8. The system of claim 7, wherein a fluid utilized by the first zone comprises at least one of: water, liquid desiccant, or combinations thereof.

9. The system of claim 6 further comprising a second zone configured for conditioning the airstream.

10. The system of claim 9, wherein a fluid utilized by the second zone comprises at least one of water, liquid desiccant, or combinations thereof.

11. A system for increasing an output of an energy producing facility comprising an air-consuming machine, the system comprising:

a gas turbine comprising an inlet system, wherein the inlet system comprises at least one of a weather hood, an inlet filter house, a transition piece, an inlet duct, and an inlet bleed heat section; and an air conditioning system (ACS) configured for adjusting a physical property of an airstream entering the gas turbine, wherein the air conditioning system comprises a plurality of modules, and wherein each module comprises:

a non-media conditioning system configured for adjusting a physical property of the airstream if an ambient condition is within a range; wherein the non-media conditioning system comprises nozzles configured for spraying a fluid onto the airstream; and a direct exchange medium configured for adjusting a physical property of the airstream.

12. The system of claim 11, wherein an operating mode of the ACS comprises at least one of: a direct evaporative mode, wherein a first conditioning circuit supplies the fluid that flows through the nozzles, wherein the fluid engages the airstream flowing through ACS; or a direct chilling mode, wherein a second conditioning circuit supplies the fluid that flows through the nozzles, wherein the fluid engages the airstream flowing through the ACS;

wherein if the fluid supplied to the non-media conditioning system is approximately greater than the dew point temperature, then the ACS operates in the direct evaporative mode; and wherein if the fluid supplied to the non-media conditioning system is approximately less than the dew point temperature, then the ACS operates in the direct chilling mode.

13. The system of claim 12, wherein a configuration of components within each module comprises: the non-media conditioning system located downstream of the inlet filter house, the direct exchange medium located downstream of the non-media conditioning system, and a mist eliminator located downstream of the direct exchange medium.

14. The system of claim 11, wherein the first conditioning circuit comprises: a non-chilled supply configured for dispersing the fluid to the nozzles; and a tank for collecting portions of the fluid dispersed; and wherein the second conditioning circuit comprises: a chilled fluid supply configured for delivering the fluid to the nozzles; and a fluid return for returning a portion of the fluid delivered.

15. The system of claim 14, wherein the inlet system comprises a plurality of modules located downstream of the inlet filter house.

16. The system of claim 12, wherein the module comprises at least two stages.

17. The system of claim 16 further comprising a first stage configured for conditioning the airstream.

18. The system of claim 17, wherein a fluid utilized by the first stage comprises at least one of: water, liquid desiccant, or combinations thereof.

19. The system of claim 16 further comprising a second stage configured for conditioning the airstream.

20. The system of claim 19, wherein a fluid utilized by the second stage comprises at least one of water, liquid desiccant, or combinations thereof.

* * * * *